(12) United States Patent
Ikeda et al.

(10) Patent No.: US 7,133,237 B2
(45) Date of Patent: Nov. 7, 2006

(54) SERVO INFORMATION WRITE METHOD, DATA STORAGE DEVICE, AND PROGRAMS

(75) Inventors: Masaomi Ikeda, Fujisawa (JP);
Nobuyuki Kitazaki, Fujisawa (JP);
Kenji Ogasawara, Fujisawa (JP);
Hirofumi Yanase, Fujisawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 300 days.

(21) Appl. No.: 10/652,477

(22) Filed: Aug. 29, 2003

(65) Prior Publication Data
US 2004/0201914 A1 Oct. 14, 2004

(30) Foreign Application Priority Data
Nov. 5, 2002 (JP) .............................. 2002-321518

(51) Int. Cl.
*G11B 21/02* (2006.01)
(52) U.S. Cl. .......................................... 360/75; 360/48
(58) Field of Classification Search ................. 360/48, 360/75, 77.08, 77.02, 77.04, 78.04, 78.14
See application file for complete search history.

(56) References Cited

U.S. PATENT DOCUMENTS

| 6,151,187 | A  | * | 11/2000 | Ogawa ..................... 360/78.14 |
| 6,344,942 | B1 | * | 2/2002 | Yarmchuk .................... 360/75 |
| 6,519,107 | B1 | * | 2/2003 | Ehrlich et al. ................ 360/75 |
| 6,611,395 | B1 | * | 8/2003 | Chainer et al. ............... 360/75 |
| 6,624,963 | B1 | * | 9/2003 | Szita ....................... 360/77.08 |
| 6,631,046 | B1 | * | 10/2003 | Szita et al. ................... 360/75 |
| 6,633,451 | B1 | * | 10/2003 | Chainer et al. ............... 360/75 |
| 6,751,042 | B1 | * | 6/2004 | Bi et al. ................... 360/77.02 |
| 6,765,744 | B1 | * | 7/2004 | Gomez et al. ................ 360/75 |
| 6,785,084 | B1 | * | 8/2004 | Szita ....................... 360/77.04 |
| 6,888,696 | B1 | * | 5/2005 | Yasuna et al. ........... 360/78.04 |

* cited by examiner

*Primary Examiner*—Fred F. Tzeng
(74) *Attorney, Agent, or Firm*—Patrick Duncan; Steven J. Cahill (57) ABSTRACT

The read/write offset between the read head and write head is used to determine the head width ratio between the read head width and write head width. The servo information is written onto the magnetic disk in accordance with the APC value and track pitch that are derived from the determined head with ratio.

17 Claims, 11 Drawing Sheets

(a) APC = 2.0

(b) APC = 1.5

(c) APC = 1.0

FIG.5

(a) APC = 0.5

(b) APC = 0.0

SERVO INFORMATION WRITE METHOD, DATA STORAGE DEVICE, AND PROGRAMS

FIELD OF THE INVENTION

The present invention relates to a method, data storage device, and programs for writing servo information onto recording media, and more particularly to a method, data storage device, and programs for servo information self-writing.

BACKGROUND OF THE INVENTION

Hard disk drives, which are widely used as a data storage device for computers and like devices, includes a magnetic head for reading user data stored on a magnetic disk or writing user data onto a magnetic disk. The magnetic head is mounted on an actuator that is oscillated by a VCM (Voice Coil Motor). When the magnetic head reads or writes user data, the actuator is driven to move the magnetic head to a specific track (target track) for positioning purposes. Magnetic head positioning control is exercised in accordance with servo information stored on a magnetic disk to move the magnetic head to a specified position. In line with recording density improvement, hard disk drives released in recent years have begun to use an MR (magnetoresistive) head, GMR (giant magnetoresistive) head, or other magnetoresistive device, which produces a magnetoresistive effect, as a read-only read head, and a transducer induction head as a write-only write head. These two heads are mounted on the same actuator but positioned at a predetermined distance from each other.

A plurality of data tracks are concentrically formed on a hard disk or other magnetic disk. Further, servo tracks, which store identification information and burst patterns beforehand, are formed in the radial direction of a magnetic disk. The aforementioned servo information comprises the identification information and burst patterns. The identification information indicates the track address of a data track. The identification information acquired by the read head is used to determine the data track on which the read head or write head is positioned. As the burst patterns, a plurality of burst pattern rows, which differ in signal storage area phase, are employed so that various signal storage areas are arranged at fixed spacing intervals and in the radial direction of a magnetic disk. In accordance with a signal (PES: Position Error Signal) that is generated by the read head depending on the burst patterns, the deviation of the read head or write head from the target data track can be detected.

The servo information is written onto a magnetic disk in a manufacturing process that is performed prior to hard disk drive shipment as a product. For an accurate read/write of user data, the servo information, which serves as the reference, needs to be accurately written. Conventionally, a dedicated device called an STW (Servo Track Writer) was used to write servo information onto a magnetic disk. Recently, however, a self servo write (SSW) method for enabling a hard disk drive to perform a servo write by itself has been proposed and put to practical use (refer to Patent Documents 1 and 2).

[Patent Document 1]
Japanese Patent Laid-Open No. 11-1999 (pages 9 and 10)

[Patent Document 2]
Japanese Patent Laid-Open No. 2002-8331 (page 3)

The conventional self servo write method, however, cannot easily determine the absolute track pitch (the distance between the track center of one track and the track center of the next adjacent track). This problem can be solved, for instance, by performing a self servo write onto the area between the inside diameter (ID) and outside diameter (OD) sections at an appropriate track pitch, regarding the obtained radial distance of the magnetic disk as an absolute length, and performing a self servo write again in such a manner as to acquire a track pitch having a desired length.

However, the use of the above method causes problems, which will now be described. If, for instance, the head width of the read head is significantly narrow as compared to a written track pitch, a deadband arises. The deadband is a region where changes in all the burst patterns formed in accordance with a track pitch cannot be read by the read head. Servo control within such a deadband becomes unstable.

On the other hand, if the head width of the write head is significantly wide as compared to a written track pitch, the write head writes data not only on the target track but also on a track adjacent to the target track. It means that the data on such an adjacent track can be overwritten.

Further, a self servo write needs to be performed twice on the entire magnetic disk surface. As a result, the servo information write process requires an increased amount of time, thereby decreasing the efficiency of hard disk drive manufacture.

The present invention is made to solve the foregoing technical problems, and has for its object to write servo information onto recording media at an improved track pitch even when the self servo write method is employed. It is a further aspect of the present invention to reduce the time required for a servo information write according to the self servo write method.

SUMARY OF THE INVENTION

The conventional self servo write method causes the aforementioned problems because it determines the track pitch without regard to the head widths of the read head and write head. The inventors of the present invention arrived at an idea of determining the track pitch in accordance with the head width of the read head or write head. The inventors then made the present invention because they found that the track pitch can be determined easily and effectively by making use of a read/write offset, which is the distance between the read head and write head.

More specifically, the servo information write method of the present invention comprises the steps of determining a feed pitch for writing servo information onto a disk-type storage medium, using a read/write offset which is the distance between a write head for writing data onto the disk-type storage medium and a read head for reading data stored on the disk-type storage medium; and causing the write head to write the servo information onto the disk-type storage medium in accordance with the determined feed pitch.

The feed pitch determination step can use the read/write offset to determine the correlation between the write width of the write head and the read width of the read head and determine the feed pitch in accordance with the determined correlation or cause the write head to write predetermined propagation patterns at a preliminary write pitch, cause the read head to read propagation patterns, and determine the feed pitch in accordance with the read propagation patterns.

The latter operation can be performed so as to write first propagation patterns onto the disk-type storage medium at a first preliminary write pitch and count the number of first propagation patterns existing within the read/write offset, write second propagation patterns onto the disk-type storage medium at a second preliminary write pitch and count the number of second propagation patterns existing within the read/write offset, and use the first propagation pattern count and second propagation pattern count to determine the feed pitch.

The data storage device of the present invention includes a read head for reading data and a disk-type storage medium for storing the data read by the read head. The track pitch of the disk-type storage medium, which is the spacing between adjacent tracks, is determined according to the head width of the read head. The track pitch is the pitch of servo tracks, which store servo information.

The data storage device further includes a write head that is positioned at a predetermined distance from the read head and used to write data onto the disk-type storage medium. The write head writes the servo information. The read head consists of a magnetoresistive device and the write head consists of a transducer induction device.

Further, the data storage device of the present invention comprises a first storage surface for storing data, a first read head for reading data stored on the first storage surface, a second storage surface for storing data on a surface other than the first storage surface, and a second read head for reading data stored on the second storage surface. The first track pitch, which is the spacing between adjacent tracks, is set on the first storage surface in accordance with the head width of the first read head. The second track pitch, which is the spacing between adjacent tracks, is set on the second storage surface in accordance with the head width of the second read head. The first and second storage surfaces are formed on the front and back sides of a single disk-type storage medium. The track pitch for the first storage surface is constant and the track pitch for the second storage surface is constant.

Further, the following expressions are satisfied when the head width of the first read head is WR1, the head width of the second read head is WR2, the first track pitch is TP1, and the second track pitch is TP2:

$TP1=\alpha WR1$ $TP2=\alpha WR2$ where $\alpha$ is a constant.

Furthermore, the following expressions are satisfied when the head width of the first read head is WR1, the head width of the second read head is WR2, the first track pitch is TP1, and the second track pitch is TP2:

$WR1>WR2$ and $TP1>TP2$

The present invention also provides programs that functionally express the individual steps of the aforementioned method according to the present invention. In one embodiment of the present invention, these programs, which are to be executed by a computer, are stored on a storage medium in such a manner that the computer can read them. Typically, CD-ROM or like media is used as the storage medium. In one embodiment, the CD-ROM drive of the computer reads the programs, which are then stored on a hard disk or in a memory or other storage for execution. In another embodiment, a program transmitter is used to supply these programs to a notebook PC or mobile terminal via a network. The program transmitter must at least include a memory for storing the programs and a program transmission means for supplying the programs via a network.

DETAILED DESCRIPTION OF THE PREFERRED EMBODIMENTS

The embodiments of the present invention will now be described in detail with reference to the accompanying drawings.

Figure 1:
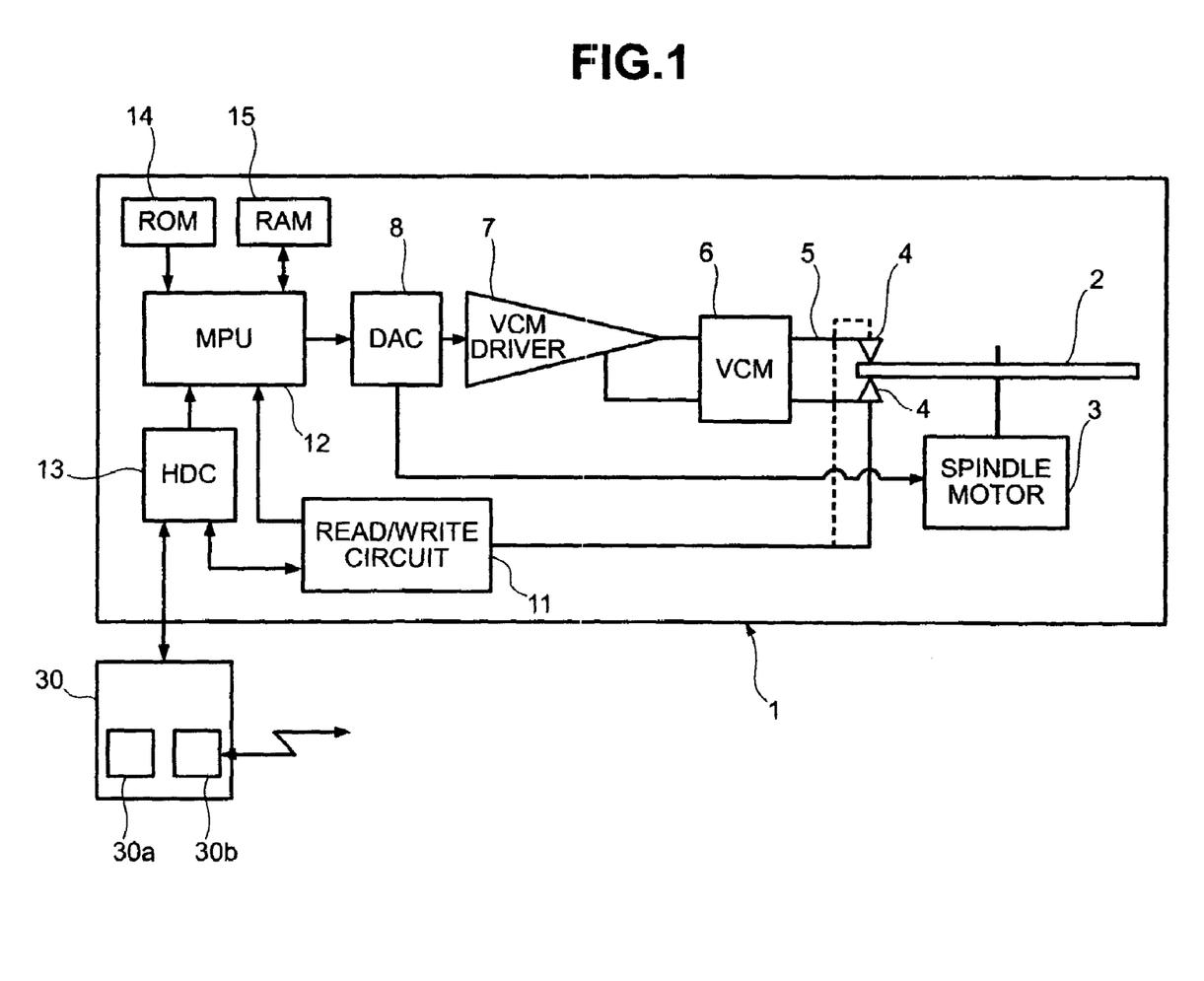
FIG. 1 is a block diagram that illustrates major components of the hard disk drive.

FIG. 1 is a block diagram that illustrates major components of a hard disk drive 1 according to one embodiment of the present invention. The hard disk drive 1 includes a magnetic disk (disk-type storage medium) 2, a spindle motor 3, a magnetic head 4, an actuator 5, a VCM (voice coil motor) 6, a VCM driver 7, a DAC (digital/analog converter) 8, a read/write circuit 11, an MPU (microprocessing unit) 12, an HDC (hard disk controller) 13, a ROM (read-only memory) 14, and a RAM (random access memory) 15, and is connected to a computer 30 via the HDC 13. Although one or more units of the magnetic disk 2 are installed as needed, FIG. 1 shows an example in which only one unit of the magnetic disk 2 is installed.

While the hard disk drive 1 is operating, the magnetic disk 2 is driven to rotate around a spindle axis of the spindle motor 3. When the hard disk drive 1 is not operating, the magnetic disk 2 stops rotating (comes to a standstill).

The magnetic head 4 is mounted at the end of the actuator 5 in such a manner that it is properly positioned relative to the front and back surfaces of the magnetic disk 2. The front and back surfaces of the magnetic disk 2 serve as the storage surfaces.

Figure 2:
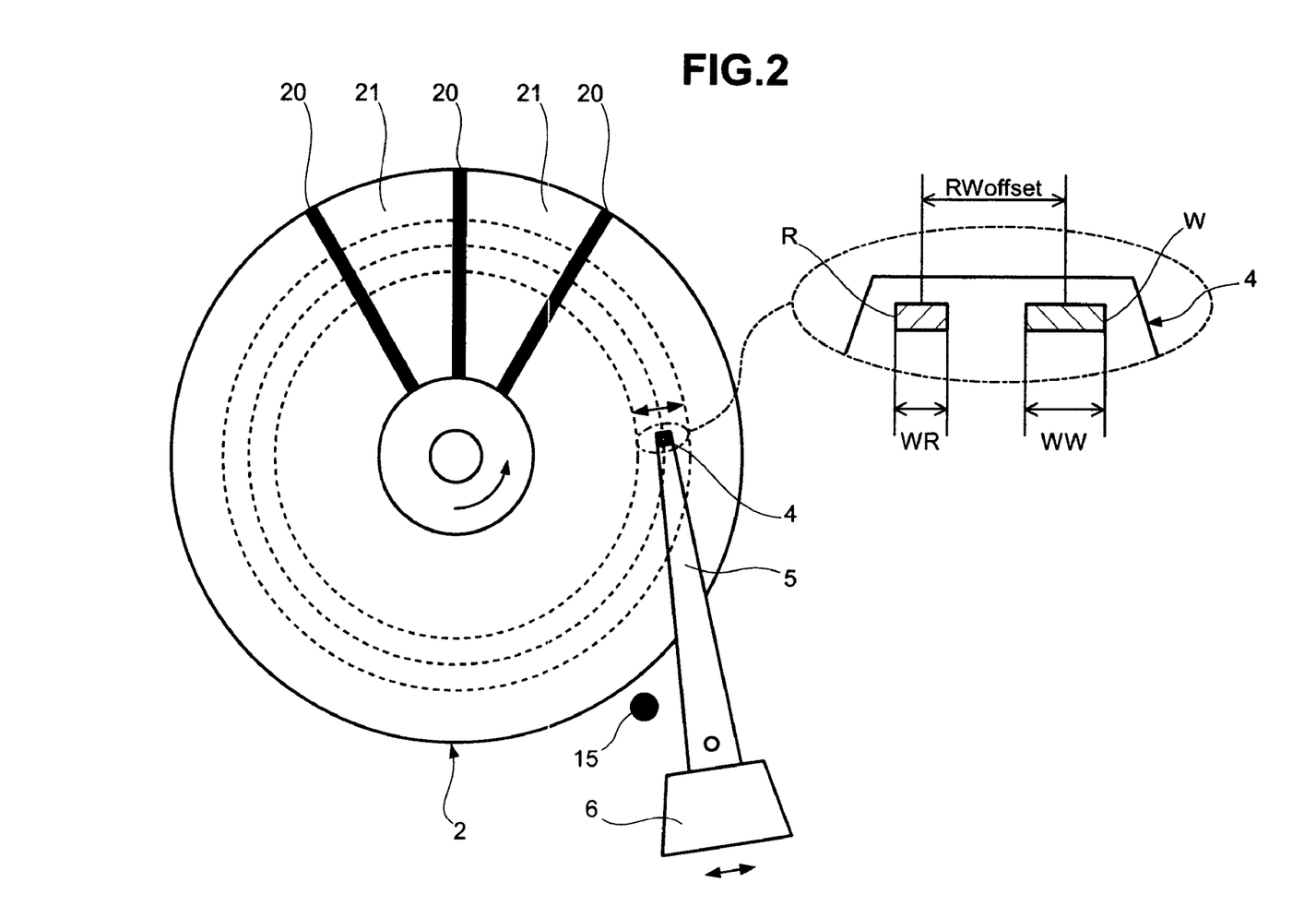
FIG. 2 is a top view of the magnetic disk, magnetic head, actuator, and VCM.

FIG. 2 is a top view of the magnetic disk 2, the magnetic head 4, the actuator 5, and the VCM 6. The magnetic head 4 includes a write head W for writing data onto the magnetic disk 2 and a read head R for reading data from the magnetic disk 2. The read head R also reads servo information that is stored on the magnetic disk 2. The write head W has the write head width WW. The read head R is positioned closer to the center of the magnetic disk 2 than the write head W. The read head width WR of the read head R is narrower than the write head width WW. More specifically, the read head R and the write head W are positioned at a predetermined distance from each other. The distance between the widthwise center of the read head R and the widthwise center of the write head W is referred to as the read/write offset (RWoffset). In the present embodiment, a transducer induction type head is used as the write head W and a GMR (giant magnetoresistive) head is used as the read head R. As the read head R, an MR (magnetoresistive) head, a TMR (tunneling magnetoresistive) head, or other magnetoresistive device may also be used.

The magnetic head 4 and the actuator 5 move, as an assembly, in the radial direction of the magnetic disk 2. A crash stop 9 is mounted on a lateral surface of the actuator 5 to limit the move of the actuator 5 toward the center of the magnetic disk 2, thereby preventing the magnetic head 4 from colliding with a spindle and other components. Further, a ramp (not shown) is positioned outside the magnetic disk 2. While the magnetic head 4 is not driven, it is parked on the ramp.

A plurality of position information (servo information) storage areas 20 are formed on a surface of the magnetic disk 2. These position information storage areas are radially arranged in the direction of the radius of the magnetic disk 2. Data storage areas 21 are formed in the remaining regions. FIG. 2 merely shows three position information storage areas 20 and the data storage areas 21, which are positioned between the position information storage areas. In reality, however, many position information storage areas 20 and data storage areas 21 are formed in the radial direction of the magnetic disk 2. The position of the read head R or write head W can be determined when the read head R reads servo information that is stored in the position information storage areas 20. The servo information comprises track identification data and burst patterns. The track identification information indicates the track address of a data track. When the magnetic head 4 reads the track identification information, it is possible to determine the track position at which the magnetic head 4 is currently placed. The burst patterns are an array of signal storage areas, which are arranged at fixed spacing intervals and in the radial direction of the magnetic disk 2. This array comprises a plurality of signal storage areas, which differ in signal storage area phase. In accordance with the signal output generated from the burst patterns, the deviation of the magnetic head 4 from a data track can be determined.

The actuator 5 is driven by the VCM 6. Therefore, it can be said that the VCM 6 drives the magnetic head 4. The VCM 6 comprises a coil-based mover and a permanent-magnet-based stator. When the VCM driver 7 supplies a predetermined current to the coil, the mover is driven to move or stop the magnetic head 4 over the magnetic disk 2.

The read/write circuit 11 performs a data read/data write process. More specifically, the read/write circuit 11 receives write data that is transferred from the computer 30 via the HDC 13, converts it to a write signal (current), and supplies the write signal to the write head W of the magnetic head 4. In accordance with the write current, the write head W writes the data onto the magnetic disk 2. Meanwhile, the read/write circuit 11 receives a read signal (current), which is read from the magnetic disk 2 by the read head R of the magnetic head 4, converts it to digital data, and outputs the digital data to the computer 30 via the HDC 13. The digital data contains the servo information.

The HDC 13 is capable of interfacing with the hard disk drive 1. Thanks to its interfacing function, the HDC 13 receives write data, which is transferred from the computer 30, and transfers the received write data the read/write circuit 11. The HDC 13 also receives read data, which is transferred from the read/write circuit, and transfers the received read data to the computer 30. Further, upon receipt of a directive command or other instruction from the computer, the HDC 13 transfers the read data to the MPU 12.

The MPU 12 provides control over the hard disk drive 1. Being capable of functioning as a servo controller, the MPU 12 exercises motion control over the magnetic head 4. The MPU 12 interprets and executes a program stored in the ROM 14. The MPU 12 determines the position of the magnetic head 4 in accordance with the servo information transferred from the read/write circuit 11, and outputs a speed control value for the magnetic head 4 to the DAC 8 in accordance with the deviation of the determined position of the magnetic head 4 from the target position. The speed control value, which is handled as a motion instruction for the magnetic head 4, is output each time the servo information is read by the read head R of the magnetic head 4.

The DAC 8 receives the speed control value, which is output from the magnetic head 4, converts it to an analog signal (voltage signal), and outputs the analog signal to the VCM driver 7.

The VCM driver 7 receives the voltage signal from the DAC 8, converts it to a drive current, and supplies the drive current to the VCM 6.

The computer 30 includes a disk drive 30a for reading programs and data from disk media such as a CD-ROM disk and DVD-ROM (DVD read-only memory) disk, and a network interface (NI/F) 30b for communicating with an external network and downloading various programs.

As regards the hard disk drive 1 of the present embodiment, servo information is written onto the magnetic disk 2 by a self servo write method during manufacture. The present embodiment assumes that the computer 30 is to be mounted on a brand-new hard disk drive 1 on which no servo information or data is written, and that the computer transmits predetermined programs to the hard disk drive 1 to perform a self servo write.

The self servo write method of the present embodiment will now be described in detail. When the self servo write method is used, the track pitch (TP) is determined by the following equation:

[Mathematical 1]

$$TP = \max(WW, WR) + (1 - APC) \cdot \min(WW, WR) \qquad (1)$$

In Equation (1), max(WW,WR) is the write head width WW or read head width WR, whichever is greater, whereas min(WW,WR) is the write head width WW or read head width WR, whichever is smaller. Under normal conditions, WW>WR. APC (A Plus C) is an index for writing propagation patterns (preliminary servo patterns formed on the magnetic disk 2 for a servo information write) and servo information onto the magnetic disk 2. This index will be described later in detail.

When the write head width WW and read head width WR are determined by Equation (1), the track pitch TP depends on the APC value only. It is therefore understood that the track pitch TP can be widened (increased) by decreasing the APC value and narrowed (decreased) by increasing the APC value.

Figure 3:
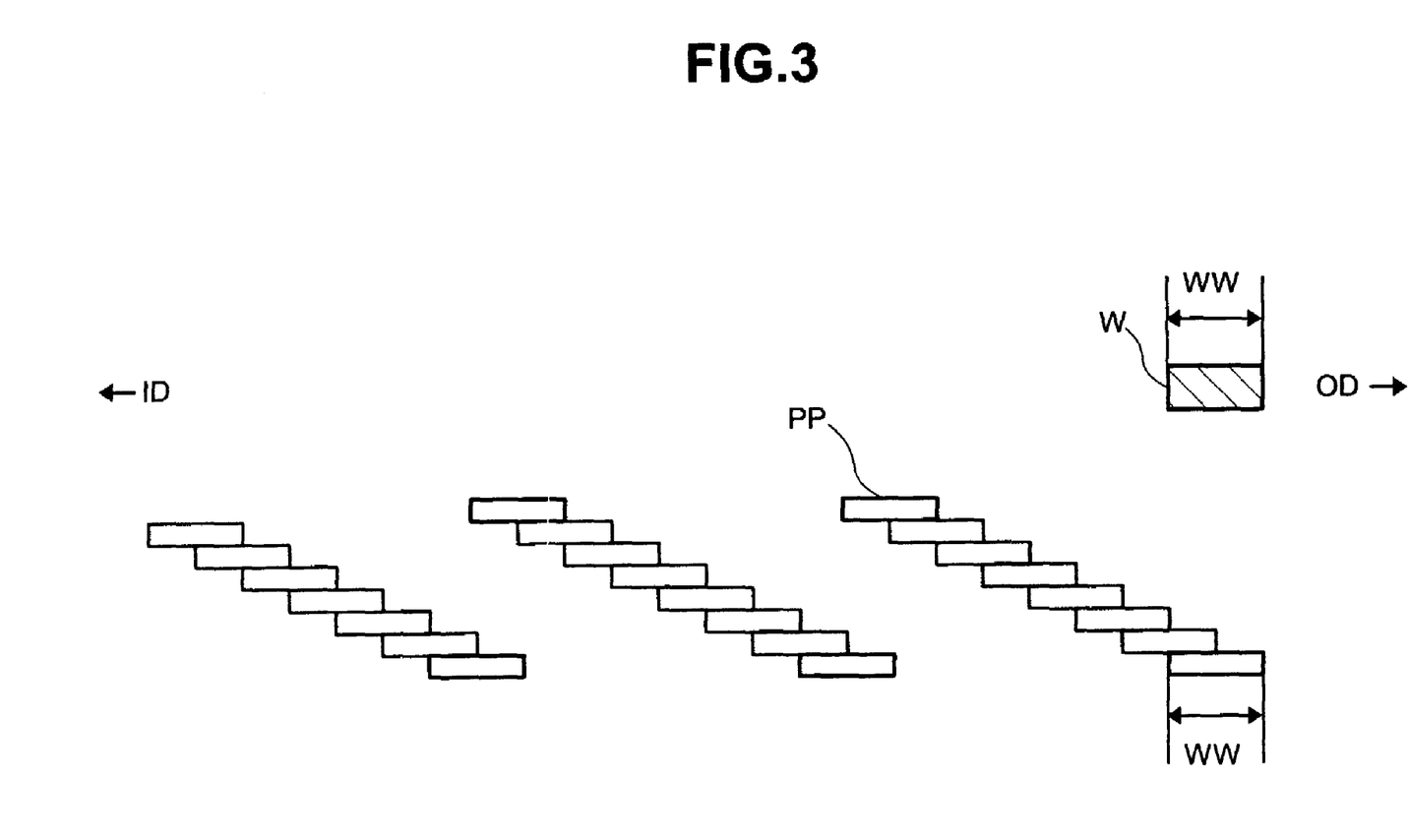
FIG. 3 shows typical propagation patterns that are formed on the magnetic disk.

APC will now be described. FIG. 3 shows typical propagation patterns PP that are formed on the magnetic disk 2. The propagation patterns PP are magnetic patterns that are written by the write head W. Therefore, the propagation pattern width is equal to the write head width WW. The propagation patterns PP are sequentially formed, beginning with the inside diameter (ID) section of the magnetic disk 2 and continuing toward the outside diameter (OD) section.

Each set consists of eight propagation patterns PP, which are written at a position that is sequentially shifted slightly outward.

APC is defined by the following equation, which is based on the outputs that are generated when three adjacent propagation patterns PP are read by the read head R:

[Mathematical 2]

$$APC=(OA+OC)/OB \quad (2)$$

Figure 4:
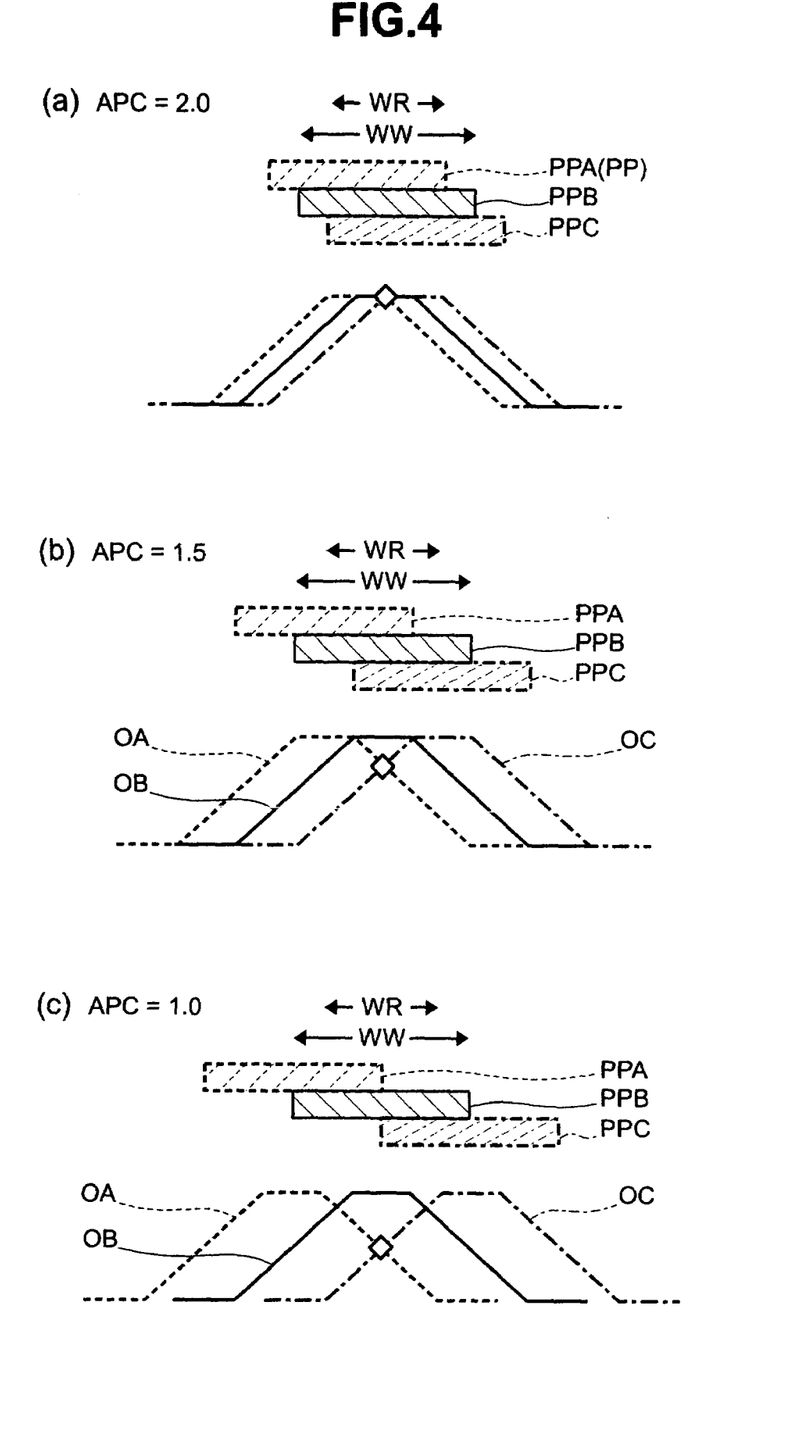
FIG. 4 shows the relationship between APC and propagation patterns.
Figure 5:
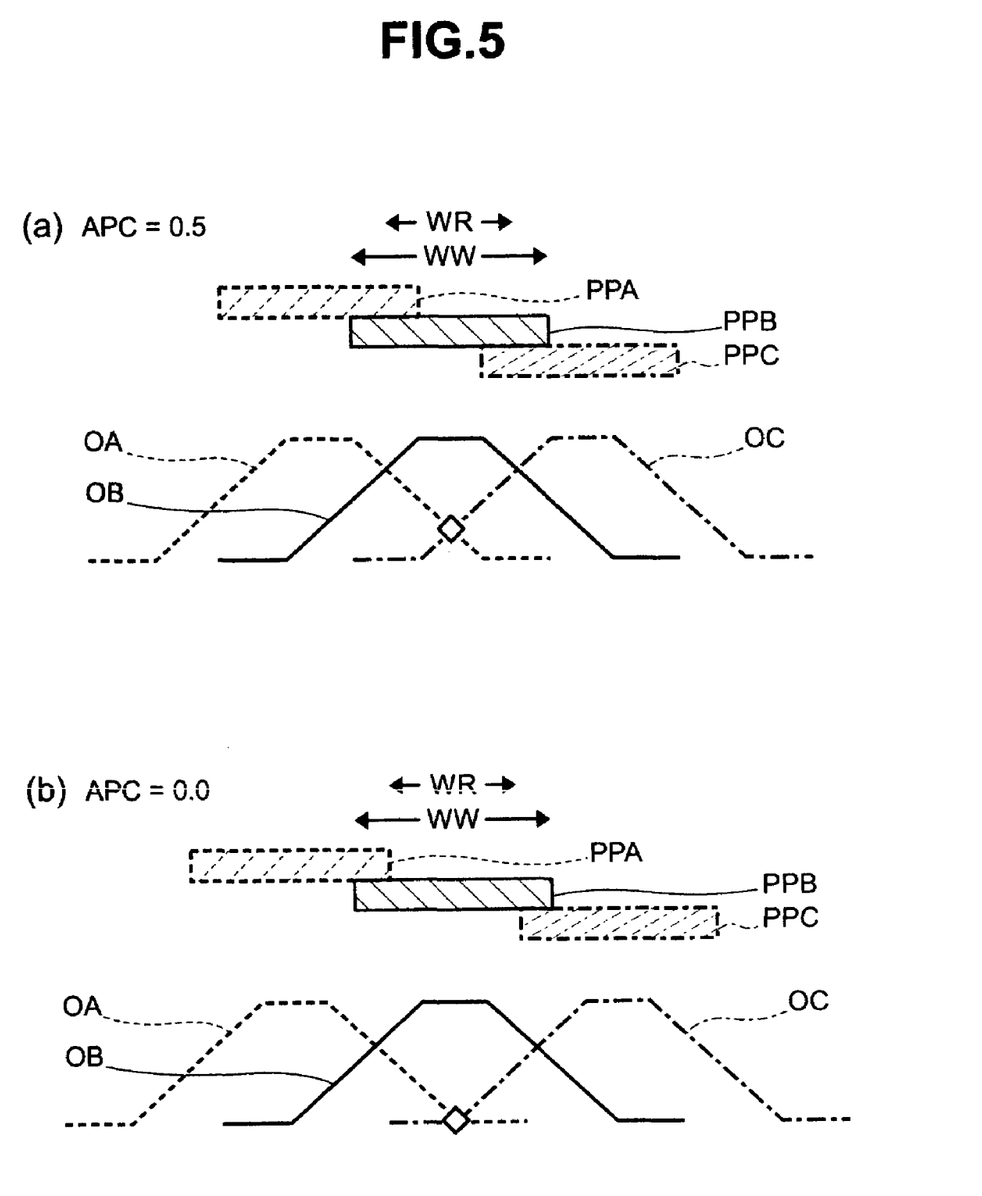
FIG. 5 shows the relationship between APC and propagation patterns.

FIGS. 4 and 5 show the relationship between APC and propagation patterns PP. For example, FIG. 4(a) relates to a case where APC=2.0 and shows the relationship between three adjacent propagation patterns PP (PPA, PPB, and PPC) and outputs OA, OB, and OC (which respectively correspond to propagation patterns PPA, PPB, and PPC) that are generated when the propagation patterns are read by the read head R. In this figure, a square mark is put at a position at which outputs OA and OC cross. APC is determined by Equation (2), which is based on outputs OA, OB, and OC. More specifically, the APC value ranges from 0 to 2. It is obvious from FIGS. 4 and 5 that the propagation amount of propagation patterns PP decreases when the APC value is great and increases when the APC value is small.

The possible APC value will now be examined to check whether it can be outside the range of 0 to 2. As stated earlier, the magnetic head 4 has the write head W and the read head R. The read/write offset RWoffset exists between these two heads. There is a constraint that propagation patterns PP written at a certain section of the magnetic disk 2 by the write head W must be readable by the read head R when the propagation patterns propagate by RWoffset (the read head R must be positioned at the center of the propagation patterns PP). This constraint is expressed by the following equation.

[Mathematical 3]

$$RWoffset=(n+1) \cdot TP/2 \quad (3)$$

In other words, an integer n+1 (track count of RW offset) satisfying Equation (3) exists.

Figure 6:
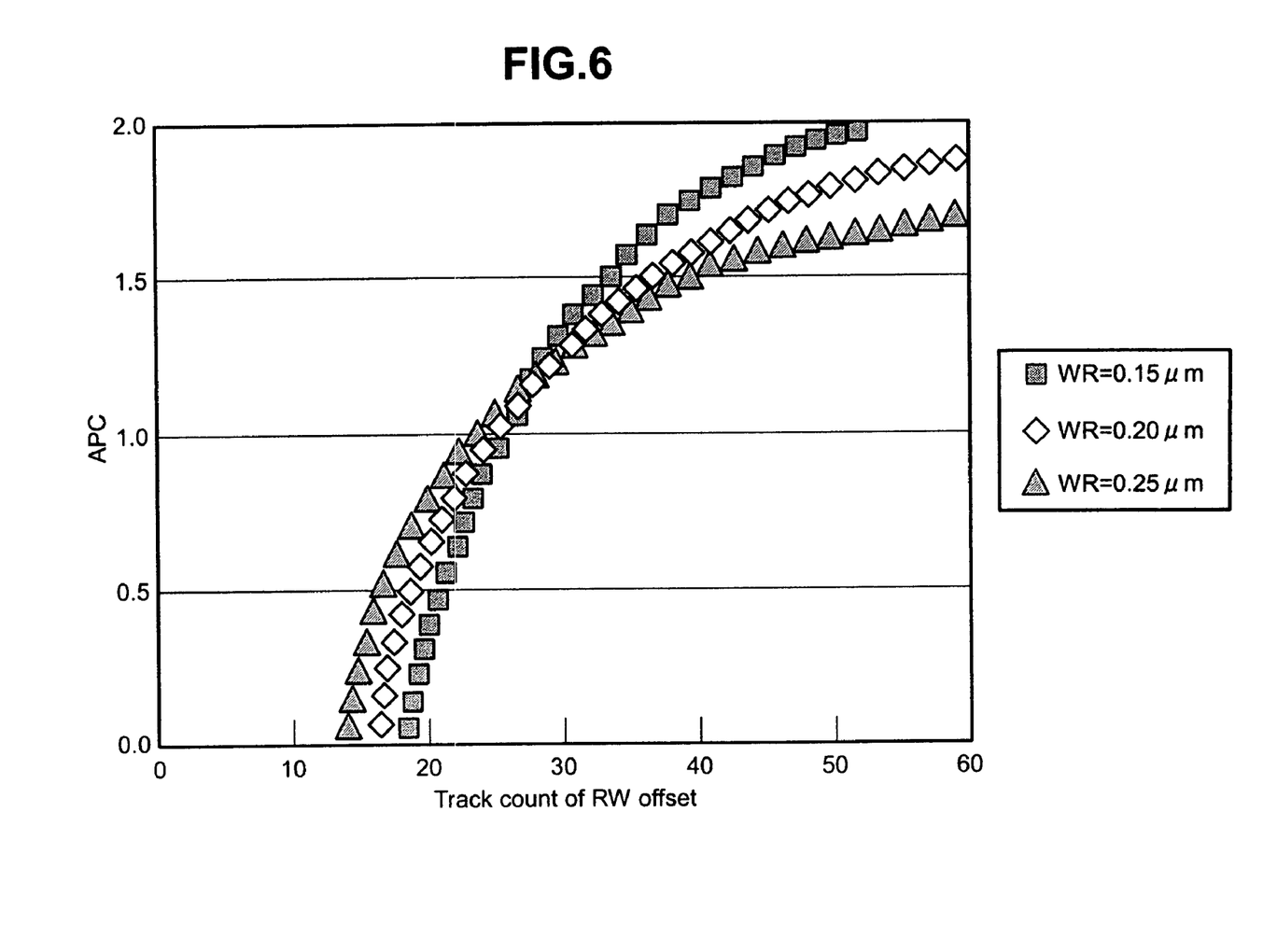
FIG. 6 is a graph illustrating the relationship between APC and the track count of RW offset.

FIG. 6 is a graph illustrating the relationship between APC and the track count of RW offset, which is the number of propagation patterns existing within the read/write offset. This figure assumes that the write head width WW is 0.30 μm, and that RWoffset is 4.0 μm, and further that the read head width WR is handled as a parameter ranging from 0.15 to 0.25 μm. As is obvious from the figure, APC takes a discrete value instead of a continuous value.

For servo information (particularly burst patterns) that is finally written on the magnetic disk 2, the relationship between the track pitch TP and the read head width WR is important. It is desirable that the ratio between these values be constant. For this purpose, the ratio between the write head width WW and the read head width WR (head width ratio: WR/WW) should be known beforehand because the track pitch TP for a self servo write is determined by Equation (1). However, if the write head width WW and read head width WR of the hard disk drive 1 is measured beforehand and predefined, the efficiency lowers. If the head width ratio WR/WW can be determined by a certain method, the write head width WW can be erased easily from Equation (1). If the write head width WW is erased from Equation (1), a self servo write can be performed at a track pitch TP that is determined according to the read head width WR.

Two possible cases where the APC value is 1.5 or 0.5 will now be examined. When WW>WR, Equation (1) can be expressed as follows:

[Mathematical 4]

$$APC=1.5$$

$$TP(1.5)=WW-0.5 \cdot WR \quad (4A)$$

$$APC=0.5$$

$$TP(0.5)=WW+0.5 \cdot WR \quad (4B)$$

Equation (3), on the other hand, can be expressed as follows:

[Mathematical 5]

$$APC=1.5$$

$$RWoffset=\{n(1.5)+1\} \cdot TP(1.5)/2 \quad (5A)$$

$$APC=0.5$$

$$RWoffset=\{n(0.5)+1\} \cdot TP(0.5)/2 \quad (5A)$$

When Equations (4A), (4B), (5A), and (5B) are rearranged with RWoffset, TP (1.5), and TP (0.5) erased, the following equation is obtained:

[Mathematical 6]

$$WR/WW=2n(1.5)-n(0.5)/n(1.5)+n(0.5)+2 \quad (6)$$

It is understandable that WR/WW can be obtained when n (1.5) and n (0.5) are determined from Equation (6). It is also understandable that WR/WW can be obtained even when two n's for different APC values other than n (1.5) and n (0.5) are determined.

The method for obtaining the aforementioned n value will now be described. First of all, the write head W writes propagation patterns PP onto the magnetic disk 2 with APC set to an arbitrary value (e.g., 1.5 or 0.5). The propagation pattern write then terminates at a certain time. The aforementioned n value can then be obtained by determining the number of times the read head R performs a seek between the instant at which the propagation pattern write terminates and the instant at which the propagation patterns are no longer readable (are gone).

Figure 7:
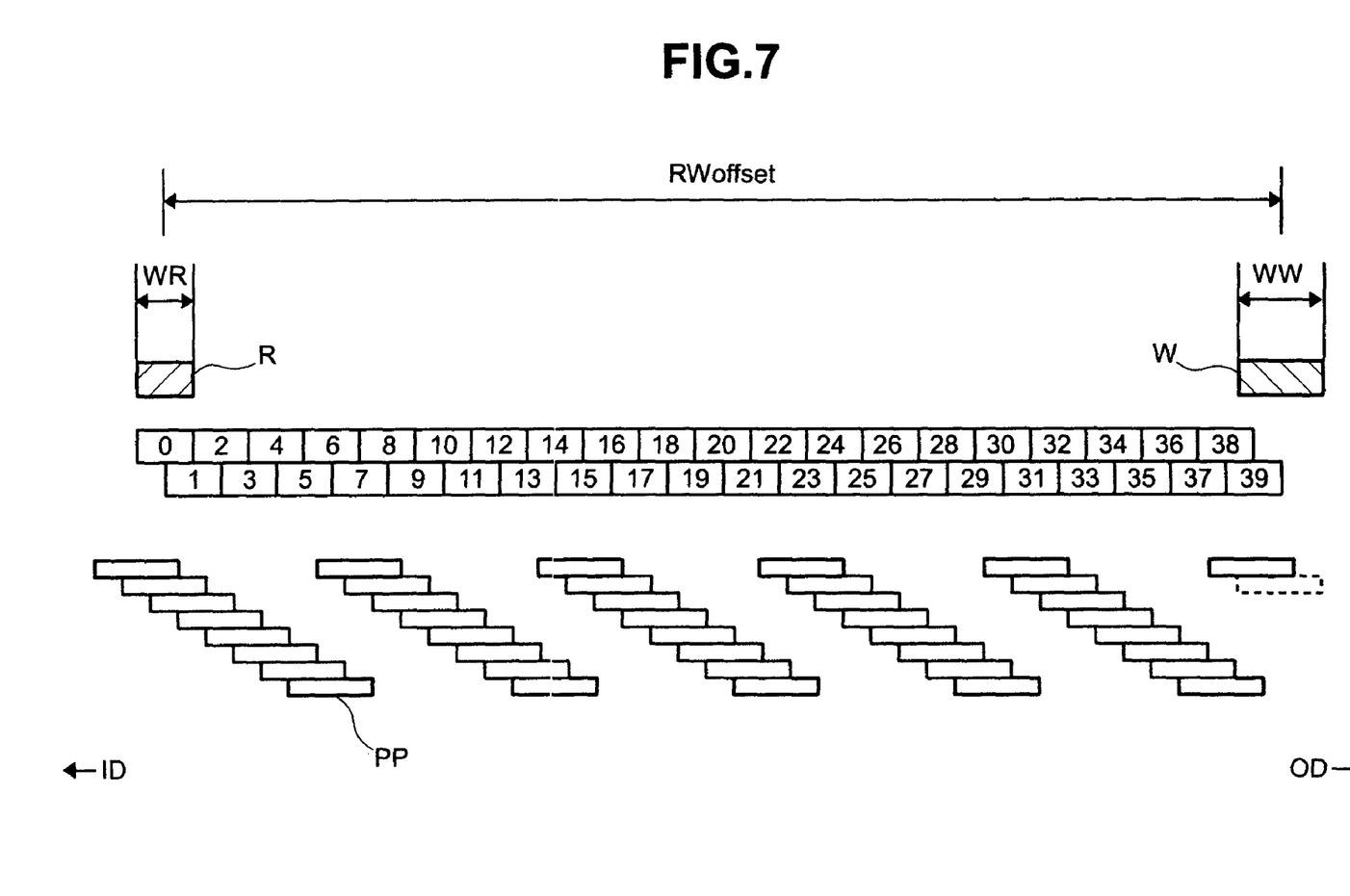
FIG. 7 shows the relationship among the propagation patterns, write head, and read head when APC=1.5.
Figure 8:
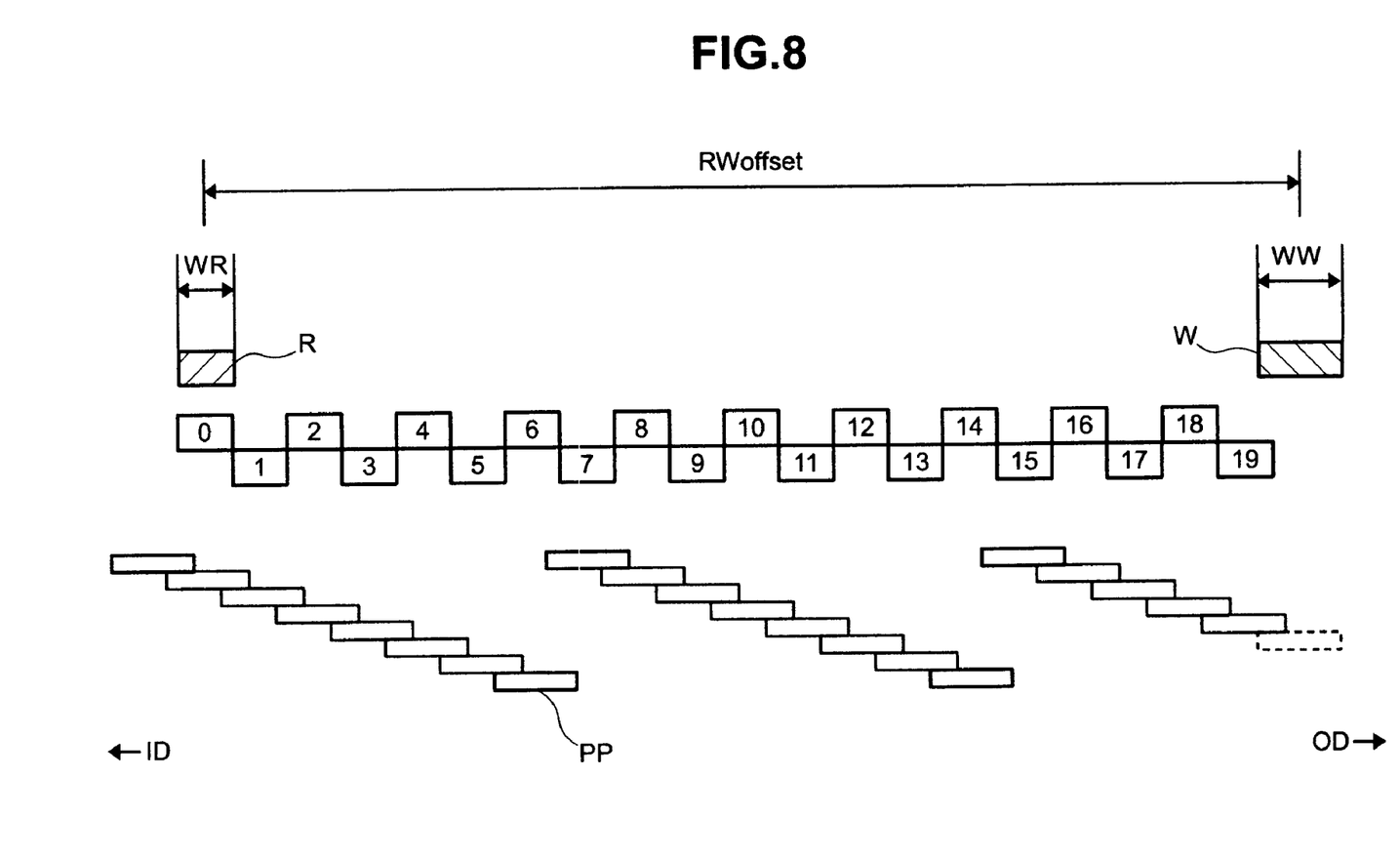
FIG. 8 shows the relationship among the propagation patterns, write head, and read head when APC=0.5.

FIG. 7 shows the relationship among the propagation patterns PP, write head W, and read head R when APC=1.5. FIG. 8 shows the relationship among the propagation patterns PP, write head W, and read head R when APC=0.5. These figures assume that the write head width WW is 0.30 μm, and that the read head width WR is 0.20 μm, and further that RWoffset is 4.0 μm. The example shown in FIG. 7 reveals that n (1.5) is 39 when APC=1.5. The example shown in FIG. 8 reveals that n (0.5) is 19 when APC=0.5. When these values are substituted into Equations (5), WR/WW=2/3, which equals to the actual WR/WW value (=0.20/0.30=2/3).

When Equations (1) and (6) are combined to yield APC with the write head width WW erased, the following equation is obtained:

[Mathematical 7]

$$APC=3 \cdot n(1.5)-n(0.5)+2/2 \cdot n(1.5)-n(0.5) -WR/TP \quad (7)$$

Consequently, the WR/WW value can be determined by Equation (7) without measuring the head width WW of the write head W or the head width WR of the read head R. Therefore, the APC value can be determined in such a manner as to obtain a desired WR/TP value. If, for instance, the desired WR/TP value in the above example is 0.75, APC=1.17 because n (1.5)=39 and n (0.5)=19.

The write head W uses the APC value (1.17 in the above example), which is obtained in the aforementioned manner, to write final servo information (track identification data and burst patterns) onto the magnetic disk 2. In the above example, TP□0.267 μm, which is greater than the read head width WR (0.20 μm), because of the relationship expressed by Equation (1) or the equation WR/TP=0.75.

Figure 9:
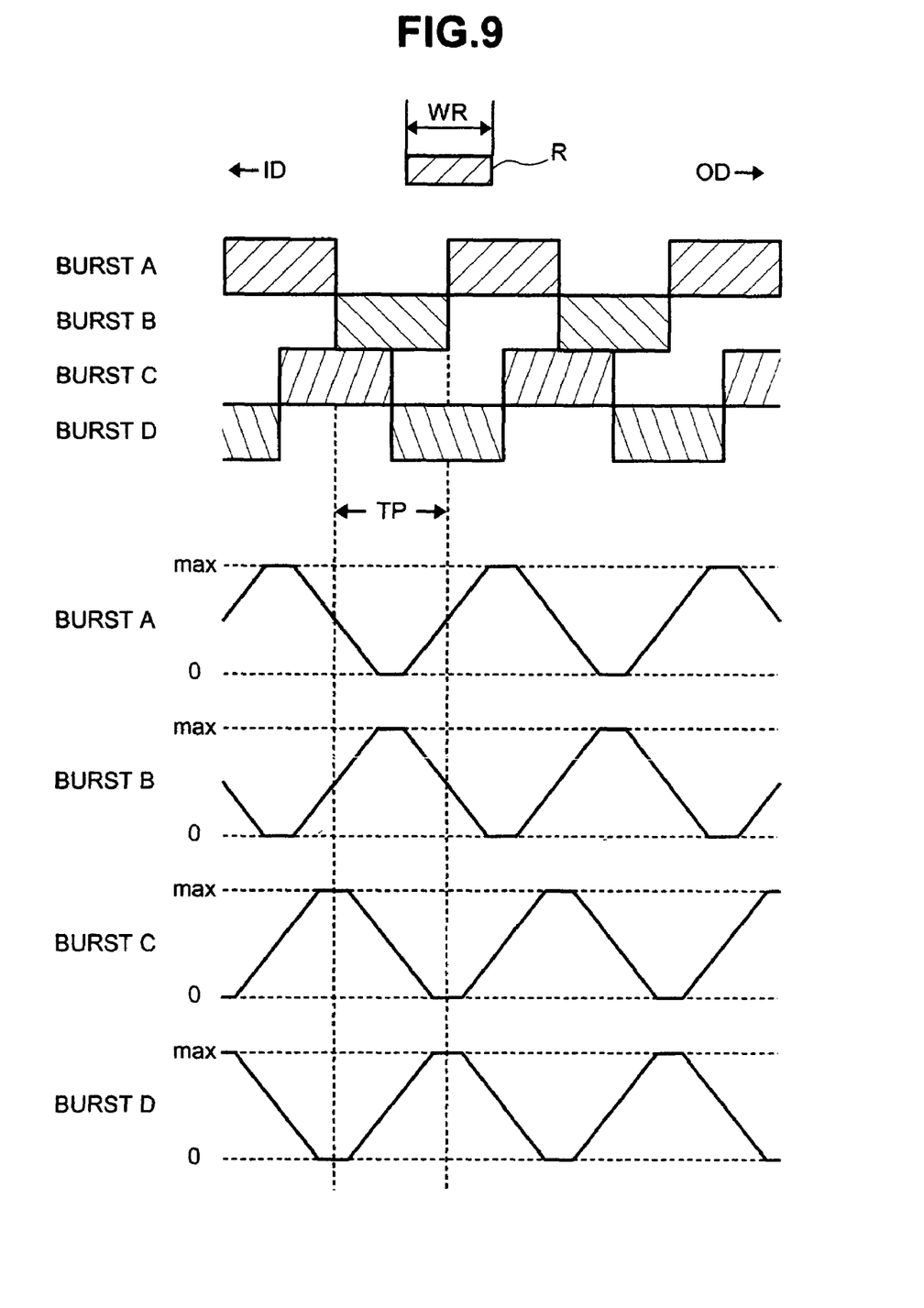
FIG. 9 shows the relationship between the written servo information (burst patterns) and the output from the read head.

FIG. 9 shows the relationship between the servo information written in the manner described above (burst patterns: burst A, burst B, burst C, and burst D) and the output from the read head R. It is understandable that when final servo information is written onto the magnetic disk 2 in accordance with the APC value obtained in the aforementioned manner, the relationship between the burst pattern (A, B, C, and D) spacing intervals and the read head width WR becomes appropriate, thereby eliminating any deadband (region where no change occurs in burst pattern A, B, C, or D).

In the present embodiment, both surfaces of the magnetic disk 2 are used as storage surfaces and the servo information is written onto both surfaces in such a manner that WR/TP=0.75. Therefore, when the head width of the read head R for the front surface of the magnetic disk 2 is WR1, the head width of the read head for the back surface is WR2, the front surface track pitch is TP1, and the back surface track pitch is TP2, the following relational expressions are satisfied:

$TP1 = WR1/0.75$ $TP2 = WR2/0.75$

In the present embodiment, the track pitch TP is set in proportion to the read head width WR of the read head R. Therefore, when the head width of the read head R for the front surface of the magnetic disk 2 is WR1, the head width of the read head for the back surface is WR2, the front surface track pitch is TP1, and the back surface track pitch is TP2. The following relational expressions are satisfied:

$WR1 > WR2$ and $TP1 > TP2$

Further, the front surface track pitch of the magnetic disk 2 is constant and the back surface track pitch is also constant. However, if the front and back surfaces differ in the read head width WR of the read head R, the front surface track pitch TP1 is not equal to the back surface track pitch TP2.

Figure 10:
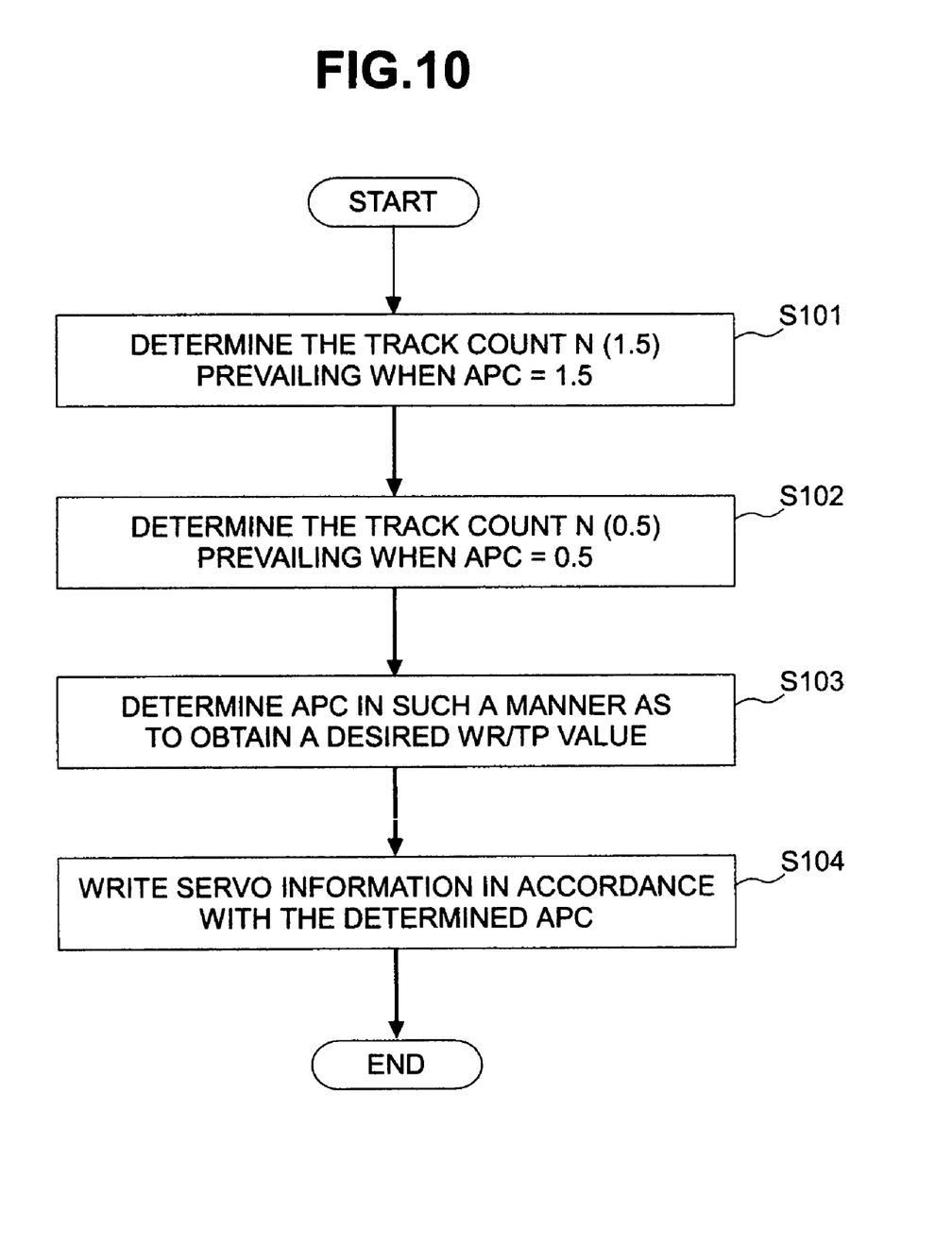
FIG. 10 is a flowchart illustrating the self servo write process.

FIG. 10 is a flowchart that illustrates the actual self servo write operation of the hard disk drive 1.

First, the track count n (1.5) prevailing when APC=1.5 is determined (step S101), and then the track count n (0.5) prevailing when APC=0.5 is determined (step S102). Next, the APC value is determined in such a manner as to obtain a desired WR/TP value according to Equation (7) (step S103). Finally, the servo information is written onto the magnetic disk 2 to conclude the process (step S104) in accordance with the APC value determined in step S103.

Figure 11:
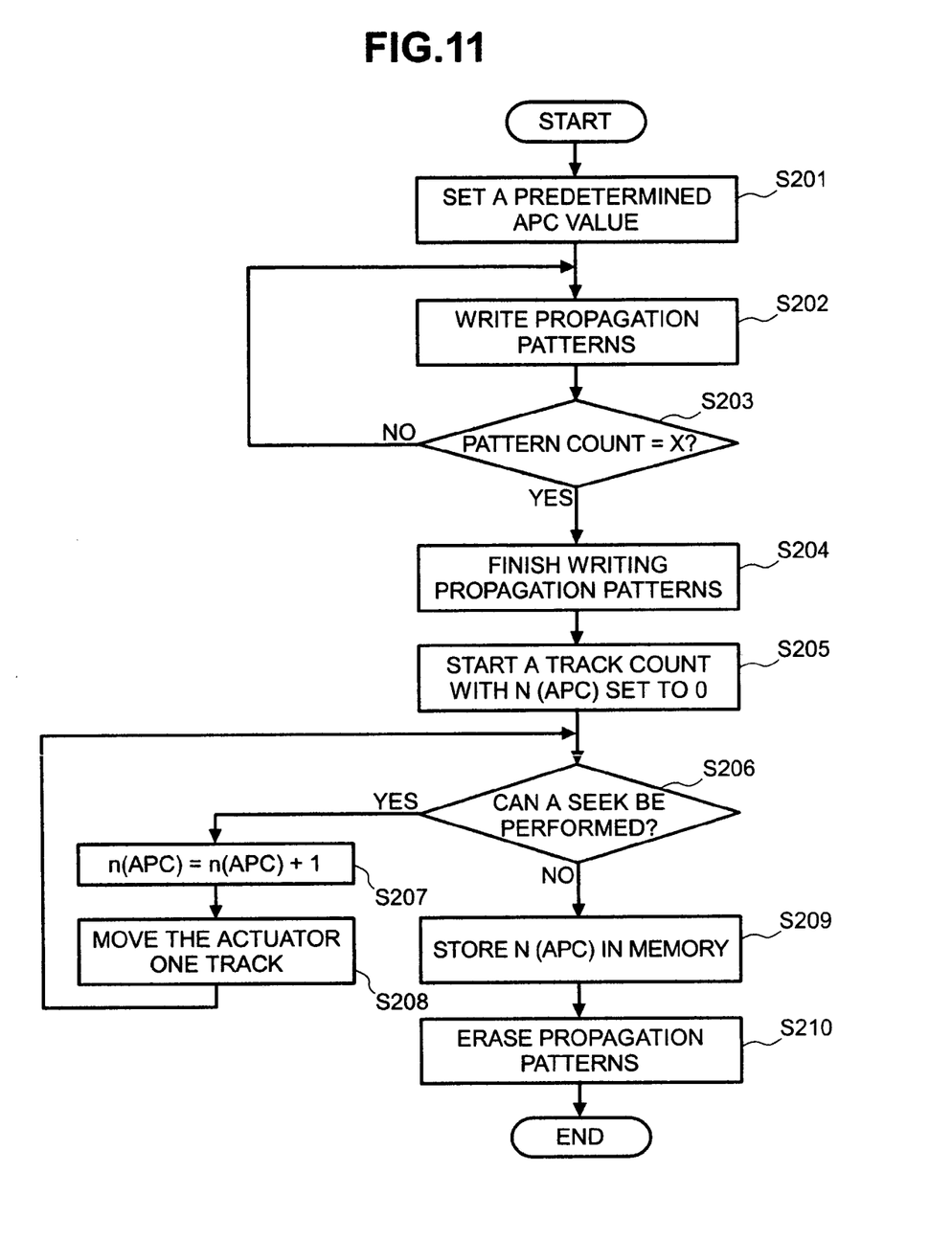
FIG. 11 is a flowchart illustrating the track count acquisition process.

FIG. 11 is a flowchart illustrating a track count acquisition process that is performed in steps S101 and S102 shown in FIG. 10 to determine the track count n (APC).

First, a predetermined APC value (1.5 or 0.5) is set (step S201), and then the write head W writes propagation patterns PP in accordance with the APC value that is set (step S202). Next, step S203 is performed to check whether the number of propagation patterns PP has reached a predefined threshold value X (approximately 100 maximum). If the threshold value is not reached, the control flow returns to step S202 so that the write head W continues to write the propagation patterns PP. If, on the other hand, the threshold value is reached, the write head W finishes writing the propagation patterns PP (step S204). The moment the write head W finishes writing the propagation patterns PP, the read head R starts a track count (step S205) with n (APC) set to 0. Next, step S206 is performed to check whether the read head R can perform a track seek. If a track seek can be performed, the value 1 is added to n (APC) (step S207) in order to move the actuator 5 one track outward (step S208), and then the control flow returns to step S206. If, on the other hand, step S206 reveals that a track seek cannot be performed, step S209 is performed to store n (APC) in memory, and then step S210 is performed to erase the propagation patterns PP, which are written by the write head W, in order to conclude the process.

The operations performed to write the propagation patterns PP during the track count acquisition process will now be described. First, a large current flows to the VCM 6 so as to strongly press the actuator 5 against the crash stop 9. The magnetic head 4 (write head W and read head R) then stops at a predetermined position in the inside diameter section of the magnetic disk 2. In the resulting state, the write head W writes the first propagation pattern PP. Next, the current flow to the VCM 6 slightly decreases to slightly reduce the pressure that the actuator 5 applies to the crash stop 9. The actuator 5 and the magnetic head 4 mounted on the actuator 5 move slightly outward over the magnetic disk 2 and then come to a stop. In the resulting state, the write head W writes the next propagation pattern PP. It means that the APC value for formulating the propagation patterns PP varies with the amount of current flow to the VCM 6. A series of these operations is continuously performed until the propagation patterns PP written onto the magnetic disk 2 by the write head W are read by the read head R and position control (servo control) can be exercised over the write head W in accordance with the propagation patterns PP read by the read head R.

In the present embodiment, the read/write offset between the read head R and the write head W is used to determine the head width ratio WR/WW between the read head width WR and the write head width WW, and the servo information is written onto the magnetic disk 2 in accordance with the APC value and track pitch TP, which are derived from the determined head width ratio WR/WW. Therefore, the track pitch TP can be set in accordance with the read head width WR to exercise proper servo control.

Further, the propagation patterns PP are only written onto a part (inside diameter section) of the magnetic disk 2. Since the self servo write operation needs to be performed only once for the entire surface of the magnetic disk 2, the time required for a servo information write can be reduced to improve the manufacturing efficiency of the hard disk drive 1.

In the above description, APC is determined in accordance with the WR/TP relationship, that is, the read head width WR. However, when Equations (1) and (5) are combined to yield APC with the read head width WR erased, APC can be determined from the write head width WW in such a manner as to obtain a desired WW/TP relationship.

In the present embodiment, programs are transmitted to the hard disk drive 1 from the computer 30 via the disk drive 30a or the network interface 30b and interpreted and executed by the MPU 12. However, the programs may alternatively be stored beforehand in the ROM 14 of the hard disk drive 1.

Although the present embodiment assumes that only one unit of the magnetic disk 2 is used, an alternative embodiment may include two or more units of the magnetic disk 2.

In such an alternative embodiment, each unit of the magnetic disk 2 performs a self servo write in the aforementioned manner, and the servo information is written onto the storage surfaces of the magnetic disk 2 at a track pitch TP based on the read head width WR of the read head R that is installed for each unit of the magnetic disk 2.

[Effects of the Invention]

As described above, the present invention makes it possible to write servo information onto a storage medium at an improved track pitch even when the self servo write method is employed. Further, the present invention reduces the time required for a servo information write according to the self servo write method.

What is claimed is:

1. A method for writing servo information, comprising the steps of:
    determining a first track count prevailing when an APC index is a first value, wherein the APC index is an index for writing propagation patterns and servo information onto a disk-type storage medium;
    determining a second track count prevailing when the APC index is a second value;
    determining a final value for the APC index using the first and the second track counts and a ratio between a read head width and a track pitch; and
    writing servo information onto the disk-type storage medium using the final value for the APC index.

2. The method according to claim 1, wherein the ratio between the read head width and the track pitch for writing servo information onto the disk-type storage medium is constant.

3. The method according to claim 1, wherein determining the first track count prevailing when the APC index is the first value further comprises writing first predetermined propagation patterns at a first preliminary write pitch and counting a number of the first predetermined propagation patterns within a read/write offset of a read/write head.

4. The method according to claim 3, wherein determining the second track count prevailing when the APC index is the second value further comprises writing second predetermined propagation patterns at a second preliminary write pitch and counting a number of the second predetermined propagation patterns within the read/write offset.

5. A data storage device, comprising:
    a read head for reading data;
    a disk-type storage medium for storing data read by said read head and having a track pitch; and
    a write head positioned at a predetermined distance from said read head and used to write data and servo information onto said disk-type storage medium, wherein the track pitch is the spacing between adjacent tracks,
    wherein the data storage device determines a first track count when an APC index is a first value, a second track count when the APC index is a second value, and a final value for the APC index using the first and the second track counts and a ratio between a head width of the read head and the track pitch, the APC index being an index for writing propagation patterns and servo information onto the disk-type storage medium,
    and wherein the write head writes servo information onto the disk-type storage medium using the final value for the APC index.

6. The data storage device according to claim 5, wherein said track pitch is the pitch of servo tracks on which servo information is stored.

7. The data storage device according to claim 6, wherein the track pitch is determined based on a predetermined ratio of the head width of the read head to the head width of the write head.

8. The data storage device according to claim 7, wherein said read head consists of a magnetoresistive device and said write head consists of a transducer induction device.

9. A data storage device, comprising:
    a first storage surface for storing data;
    a first read head for reading data stored on said first storage surface;
    a first write head for writing data onto said first storage surface;
    a second storage surface for storing data on a surface other than said first storage surface; and
    a second read head for reading data stored on said second storage surface;
    a second write head for writing data onto said second storage surface:
    wherein the data storage device determines a first track count when an APC index is a first value, a second track count when the APC index is a second value, and a third value for the APC index using the first and the second track counts and a ratio between a head width of the first read head and a first track pitch on the first storage surface, the APC index being an index for writing propagation patterns and servo information onto the first and the second storage surfaces,
    wherein the first write head writes servo information onto the first storage surface using the third value for the APC index,
    wherein the data storage device determines a third track count when an APC index is a fourth value, a fourth track count when the APC index is a fifth value, and a sixth value for the APC index using the third and the fourth track counts and a ratio between a head width of the second read head and a second track pitch on the second storage surface,
    and wherein the second write head writes servo information onto the second storage surface using the sixth value for the APC index.

10. The data storage device according to claim 9, wherein said first storage surface and said second storage surface are formed on the front and back sides of a single disk-type storage medium.

11. The data storage device according to claim 9, wherein the following expressions are satisfied when the head width of said first read head is WR1, the head width of said second read head is WR2, said first track pitch is TP1, and said second track pitch is TP2:

$$TP1 = \alpha WR1$$

$$TP2 = \alpha WR2$$

where a is α constant.

12. The data storage device according to claim 9, wherein the following expressions are satisfied when the head width of said first read head is WR1, the head width of said second read head is WR2, said first track pitch is TP1, and said second track pitch is TP2:

$$WR1 > WR2 \text{ and } TP1 > TP2.$$

13. The data storage device according to claim 9, wherein the first track pitch for said first storage surface is constant and the second track pitch for said second storage surface is constant.

14. A computer program product embodied upon a computer readable medium for writing servo information on a disk-type storage medium, the computer program product comprising:
  code for determining a first track count when an APC index is a first value, the APC index being an index for writing propagation patterns and servo information onto a disk-type storage medium;
  code for determining a second track count when the APC index is a second value;
  code for determining a final value for the APC index using the first and the second track counts and a ratio between a head width of a read head and a track pitch;
  code for writing servo information onto the disk-type storage medium using the final value for the APC index.

15. The computer program product according to claim 14 wherein the track pitch is determined based on a write width of a write head for writing data onto the disk-type storage medium and the head width of the read head for reading data stored on the disk-type storage medium.

16. The computer program product according to claim 14 wherein the code for determining the first track count when the APC index is the first value further comprises code for writing first predetermined propagation patterns at a first preliminary write pitch and code for counting a number of the first predetermined propagation patterns within a read/write offset.

17. The computer program product according to claim 16 wherein the code for determining the second track count when the APC index is the second value further comprises code for writing second predetermined propagation patterns at a second preliminary write pitch and code for counting a number of the second predetermined propagation patterns within the read/write offset.

* * * * *

UNITED STATES PATENT AND TRADEMARK OFFICE
CERTIFICATE OF CORRECTION

PATENT NO.        : 7,133,237 B2
APPLICATION NO.   : 10/652477
DATED             : November 7, 2006
INVENTOR(S)       : Masaomi Ikeda et al.

Page 1 of 1

It is certified that error appears in the above-identified patent and that said Letters Patent is hereby corrected as shown below:

Column 12, Claim 11, Line 56: "a" should be changed to --α--
Column 12, Claim 11, Line 56: "α" should be changed to --a--

Signed and Sealed this

Twenty-first Day of July, 2009

JOHN DOLL
*Acting Director of the United States Patent and Trademark Office*